US009610902B2

(12) United States Patent
Rapa, Jr. et al.

(10) Patent No.: US 9,610,902 B2
(45) Date of Patent: Apr. 4, 2017

(54) ASSEMBLY WITH SLIP JOINT FOR FASTENING VEHICLE COMPONENT AND METHOD OF ASSEMBLY

(71) Applicant: GM GLOBAL TECHNOLOGY OPERATIONS LLC, Detroit, MI (US)

(72) Inventors: Edward A. Rapa, Jr., Waterford, MI (US); Cynthia M. Leahy, Beverly Hills, MI (US); John T. Cox, Bay City, MI (US); Moonis F. Khan, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/540,052

(22) Filed: Nov. 13, 2014

(65) Prior Publication Data
US 2015/0266429 A1   Sep. 24, 2015

Related U.S. Application Data

(60) Provisional application No. 61/955,493, filed on Mar. 19, 2014.

(51) Int. Cl.
*F16M 13/00* (2006.01)
*B60R 11/00* (2006.01)

(52) U.S. Cl.
CPC ....... *B60R 11/00* (2013.01); *B60R 2011/0038* (2013.01); *B60R 2011/0052* (2013.01); *Y10T 29/49622* (2015.01)

(58) Field of Classification Search
CPC ...................................... B60R 11/00
USPC ........ 248/637, 638, 640, 680; 180/292, 295, 180/296, 299
See application file for complete search history.

(56) References Cited

U.S. PATENT DOCUMENTS

| | | | | |
|---|---|---|---|---|
| 4,240,517 A | * | 12/1980 | Harlow, Jr. | ........ B60G 21/0551 180/295 |
| 6,029,765 A | * | 2/2000 | Chou | ................... B60K 5/1216 180/292 |
| 6,270,066 B1 | * | 8/2001 | Pasek | .................... F16F 1/3814 180/299 |
| 8,875,500 B2 | * | 11/2014 | Bednarz | ............... E02F 9/0866 248/201 |

(Continued)

FOREIGN PATENT DOCUMENTS

| | | |
|---|---|---|
| CN | 2793180 Y | 7/2006 |
| CN | 201313264 Y | 9/2009 |

(Continued)

*Primary Examiner* — Steven Marsh
(74) *Attorney, Agent, or Firm* — Quinn IP Law

(57) ABSTRACT

An assembly for supporting a first vehicle component manages loading of the first vehicle component under applied forces by enabling a slip joint connection between the first vehicle component and a supportive mounting bracket. More specifically, the assembly includes a mounting bracket that has a slot. A plate is fit within the slot. A stud extends from the plate. The stud is configured to extend through an opening in the first vehicle component when the first vehicle component is mounted to the mounting bracket to capture the mounting bracket between the plate and the first vehicle component at the stud. The mounting bracket and the plate are cooperatively configured as a slip joint. A method of assembly is also provided.

20 Claims, 10 Drawing Sheets

(56) References Cited

U.S. PATENT DOCUMENTS

| | | | |
|---|---|---|---|
| 2007/0145228 A1* | 6/2007 | Itoh | B60R 11/02 248/637 |
| 2008/0105227 A1* | 5/2008 | Matsuura | F02F 7/0073 123/90.15 |
| 2012/0076680 A1* | 3/2012 | Bahmata | F04B 39/0044 417/572 |

FOREIGN PATENT DOCUMENTS

| | | |
|---|---|---|
| CN | 202152778 Y | 2/2012 |
| WO | 2009000987 A2 | 12/2008 |

\* cited by examiner

ASSEMBLY WITH SLIP JOINT FOR FASTENING VEHICLE COMPONENT AND METHOD OF ASSEMBLY

CROSS-REFERENCE TO RELATED APPLICATION

This application claims the benefit of U.S. Provisional Application No. 61/955,493, filed Mar. 19, 2014, which is hereby incorporated by reference in its entirety.

TECHNICAL FIELD

The present teachings generally include an assembly for fastening a vehicle component.

BACKGROUND

Vehicles are often equipped with various components configured to manage the energy of an applied force. For example, a bumper may be attached at the front of a vehicle to manage energy applied to the bumper.

SUMMARY

An assembly for supporting a first vehicle component manages loading of the first vehicle component under applied forces by enabling a slip joint connection between the first vehicle component and a supportive mounting bracket. More specifically, the assembly includes a mounting bracket that has a slot. A plate is fit within the slot. A stud extends from the plate. The stud is configured to extend through an opening in the first vehicle component when the first vehicle component is mounted to the mounting bracket to capture the mounting bracket between the plate and the first vehicle component at the stud.

The mounting bracket and the plate are cooperatively configured as a slip joint so that first vehicle component, the stud, and the plate move together relative to the mounting bracket as the plate slides out of the slot to release the mounting bracket from the first vehicle component at the stud in response to an applied force of at least a predetermined magnitude. The first vehicle component can remain secured to the mounting bracket at at least one additional location when the slip joint releases. By releasing at the slip joint, however, loading of the first vehicle component is less affected by loading and movement of the mounting bracket. Energy management of an applied force is thus not dependent on loading of the first vehicle component by the mounting bracket. The first vehicle component may thus be configured as a lighter weight component than if the mounting bracket did not release at the slip joint. The first vehicle component may be a power electronics housing positioned in an engine compartment of a vehicle, but is not limited to such. A method of assembly is provided that enables the slip joint connection of the mounting bracket and the first vehicle component.

The above features and advantages and other features and advantages of the present teachings are readily apparent from the following detailed description of the best modes for carrying out the present teachings when taken in connection with the accompanying drawings.

DETAILED DESCRIPTION

Figure 1:
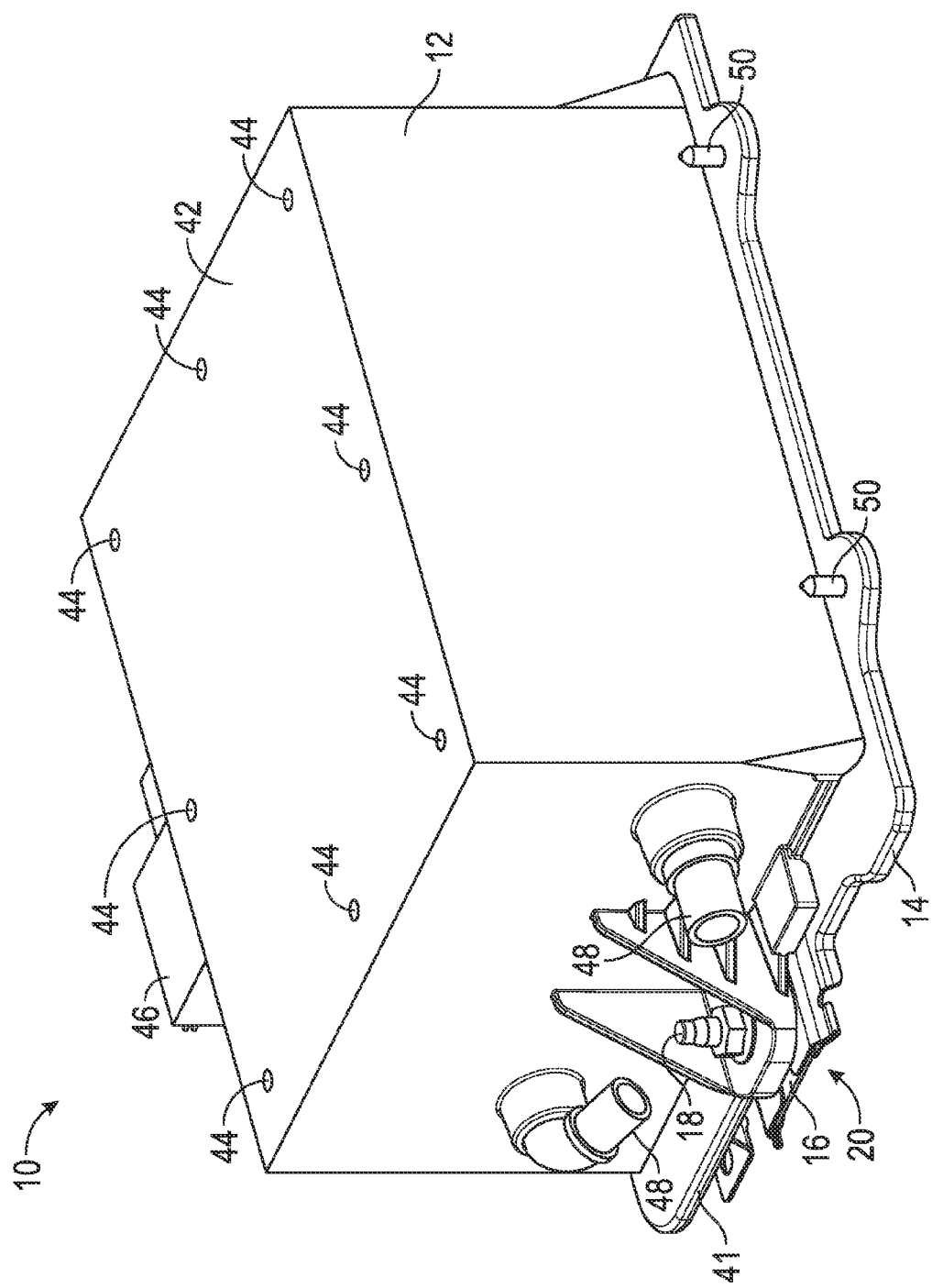
FIG. 1 is a schematic illustration in perspective view of an assembly supporting a power electronics housing and including a slip joint at one end of a mounting bracket.

Referring to the drawings, wherein like reference numbers refer to like components throughout the views, FIG. 1 shows an assembly 10 supporting a power electronics housing 12, also referred to herein as a first vehicle component 12. As further discussed herein, the assembly 10 includes a mounting bracket 14 and a plate 16 with a weld stud 18. The assembly 10 is configured to fasten to the power electronics housing 12 as a slip joint 20. This allows the power electronics housing 12 to release from the mounting bracket 14 at the slip joint 20, thereby reducing loading on the power electronics housing 12 when a force is applied directly or indirectly to the mounting bracket 14, to the power electronics housing 12, or to both. It should be appreciated that the assembly 10 with the slip joint 20 may be used to support other types of vehicle components to achieve similar energy management, and is not limited to the support of a power electronics housing 12.

Figure 2:
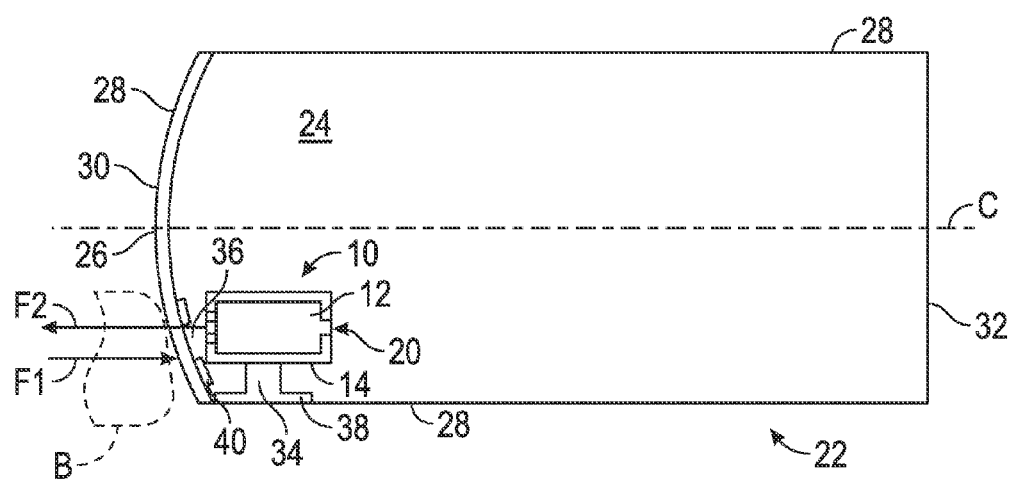
FIG. 2 is a schematic illustration in top view of a vehicle with the assembly and power electronics housing of FIG. 1 and showing a barrier in phantom in contact with a bumper at a lateral offset from a center longitudinal axis of the vehicle.

FIG. 2 shows a vehicle 22 with the assembly 10 supporting the power electronics housing 12 in a compartment 24 near a forward end 26 of the vehicle 22. The compartment 24 can be referred to as an engine compartment or as a motor compartment. The assembly 10 is not limited to use in vehicles having engines. The assembly 10 may be used in vehicles of all powertrain types, including those that do not have an engine. The compartment 24 is defined by the body structure 28 of the vehicle 22, including a bumper assembly 30 that establishes the forward end 26. The vehicle 22 has a longitudinal center axis C extending from the forward end 26 to a rearward end 32. The mounting bracket 14 is supported by various brackets 34, 36 that connect directly or indirectly to portions of the body structure 28 such as an upper rail 38 and an upper core support 40. As such, when a barrier B contacts the bumper assembly 30 with an applied force F1, the mounting bracket 14 tends to initially be pulled in a forward direction by a force F2 applied to the mounting bracket 14 via the various brackets 34, 36 in reaction to the applied force F1, in part because the mounting bracket 14 is positioned higher in the engine compartment 24 than the contact point of the barrier B to the bumper assembly 30.

The barrier B is shown applying a laterally-offset load to the bumper assembly 30. As used herein, a laterally-offset load is a load applied to the bumper assembly 30 that is centered at a lateral distance from the center longitudinal axis C. It should be appreciated that the slip joint 20 may be configured to release under a laterally-centered load of at least a predetermined magnitude. Accordingly, by utilizing the assembly 10 with the slip joint 20 as described herein, the power electronics housing 12 partially releases from the mounting bracket 14 at a rearward end 41 of the mounting bracket 14 where the slip joint 20 is located, allowing movement of the power electronics housing 12 relative to the mounting bracket 14 at the slip joint 20, thereby reducing loading of the power electronics housing 12.

Figure 3:
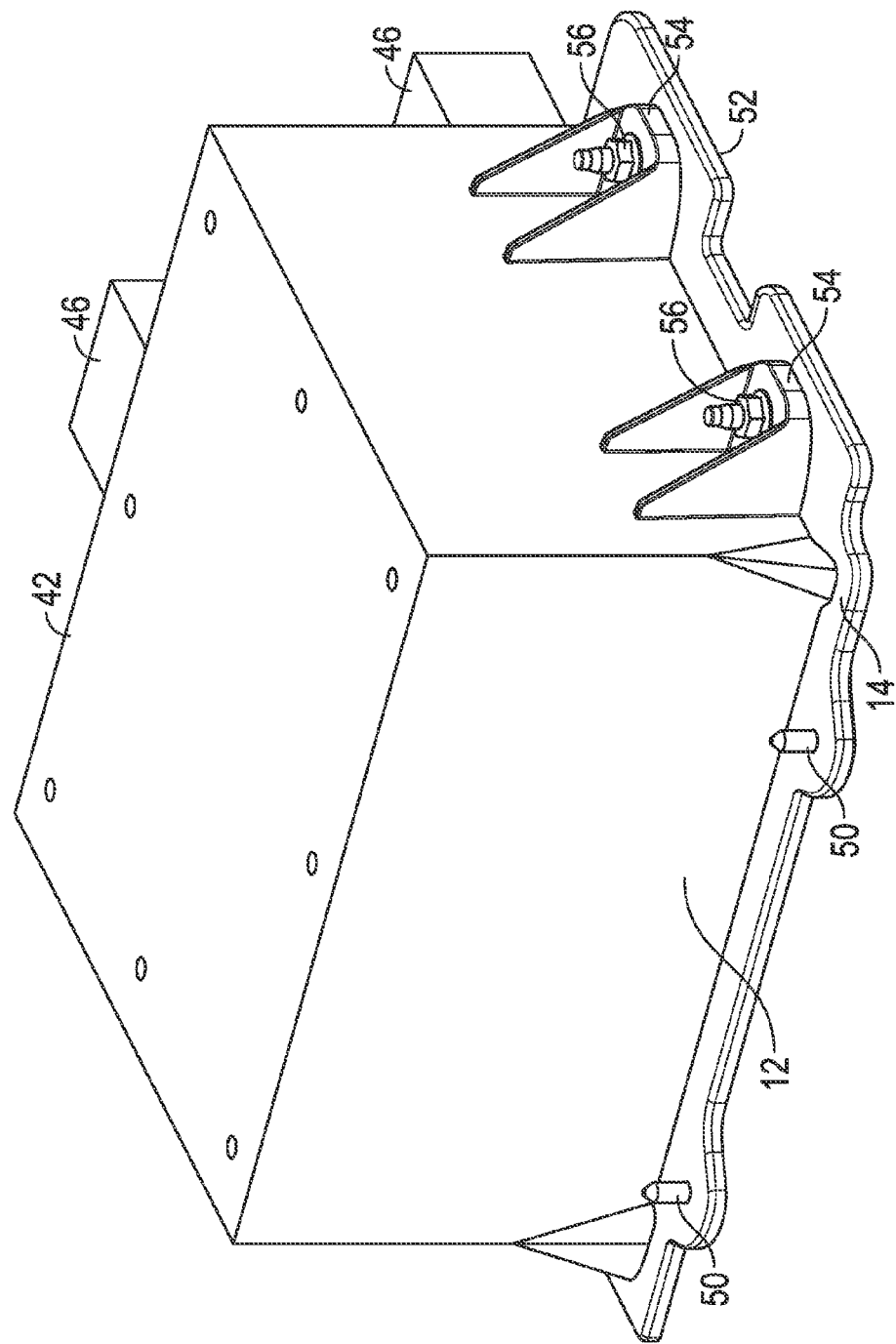
FIG. 3 is a schematic illustration in perspective view of the assembly of FIG. 1 showing additional fastener joints at another end of the mounting bracket.
Figure 4:
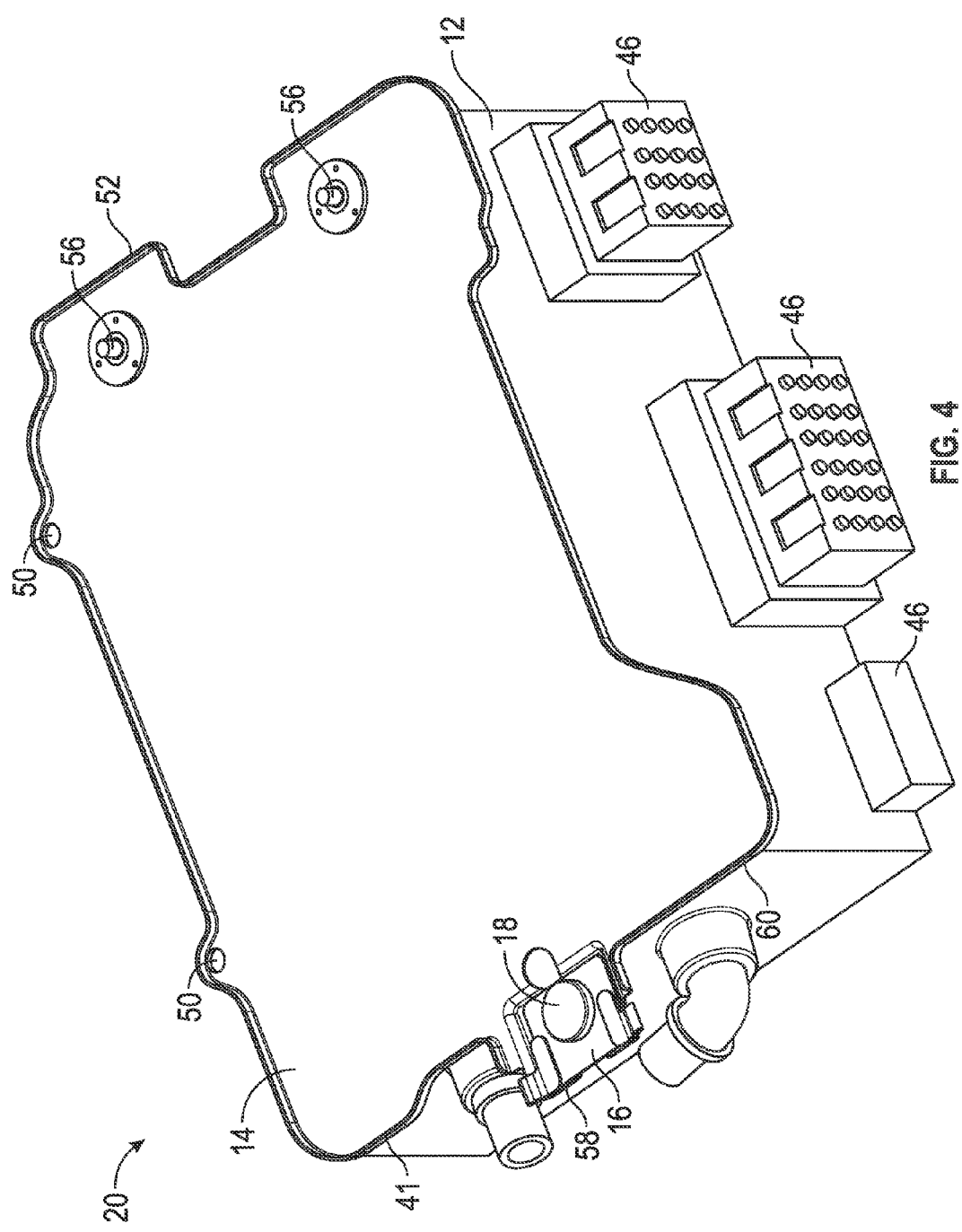
FIG. 4 is a schematic illustration in perspective view of the assembly of FIGS. 1 and 3 showing an underside of the mounting bracket including the slip joint.

Referring again to FIG. 1, the power electronics housing 12 is shown for purposes of simplicity as generally box-shaped with a lid 42 attached by various fasteners 44 to four side walls of the housing 12. The housing 12 may be a cast steel component. The housing 12 and lid 42 may have more complex shapes than shown, the fasteners 44 may be in different positions, and there may be fewer or more fasteners within the scope of the present teachings. For example, the housing 12 can have various supportive ribs cast in various areas. The housing 12 has a cavity defined between the four walls and a bottom of the housing 12. The lid 42 covers various power electronics (not shown) contained within the cavity of the housing 12. One or more power connectors 46 extend through the housing 12 as shown in FIGS. 1, 3, and 4 to allow electrical access to the power electronics in the cavity through the housing 12. The power connectors 46 may be positioned differently within the scope of the present teachings. Coolant connectors 48 are shown extending from the housing 12 and are configured to permit coolant flow through the housing 12 to cool the power electronics in the cavity. A coolant line (not shown) that connects to at least one of the coolant connectors 48 can be supported on the mounting bracket 14 and connected thereto by fasteners 50.

FIG. 3 shows the end 52 of the mounting bracket 14 that is positioned as the forward end 52 when installed in the vehicle 22 of FIG. 2. The forward end 52 of the mounting bracket 14 is also referred to herein as the first end and the rearward end 41 of the mounting bracket 14 is referred to herein as the second end. The forward end 52 is further forward in the vehicle 22, closer to the bumper assembly 30 than the rearward end 41. At the forward end 52, the power electronics housing 12 has two flanges 54 at which fasteners 56 secure the housing 12 to the mounting bracket 14. The fasteners 56 can be threaded bolts and nuts, weld studs and nuts, or any other suitable fastening mechanisms. The fasteners 56 are configured to retain the power electronics housing 12 to the mounting bracket 14 when the applied force F1 contacts the bumper assembly 30. Stated differently, the mounting bracket 14 and the fasteners 56 do not establish slip joints at the forward end 52. FIG. 4 shows the underside of the mounting bracket 14 and illustrates the fasteners 56 as establishing fixed joints at the mounting bracket 14 rather than the slip joint 20 established at the rearward end 41. FIG. 4 shows that the mounting bracket 14 forms a slot 58 at a perimeter 60 of the mounting bracket 14. When the mounting bracket 14 is installed in the vehicle 22, the slot 58 opens rearward. The plate 16 is shown inserted in the slot in FIG. 4.

Figure 5:
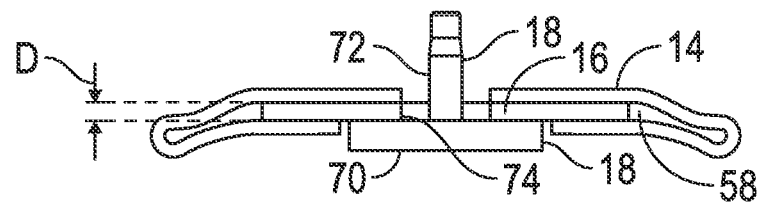
FIG. 5 is a schematic partially fragmentary side view illustration of a plate and a weld stud of the assembly of FIG. 1 in a slot of the mounting bracket.
Figure 6:
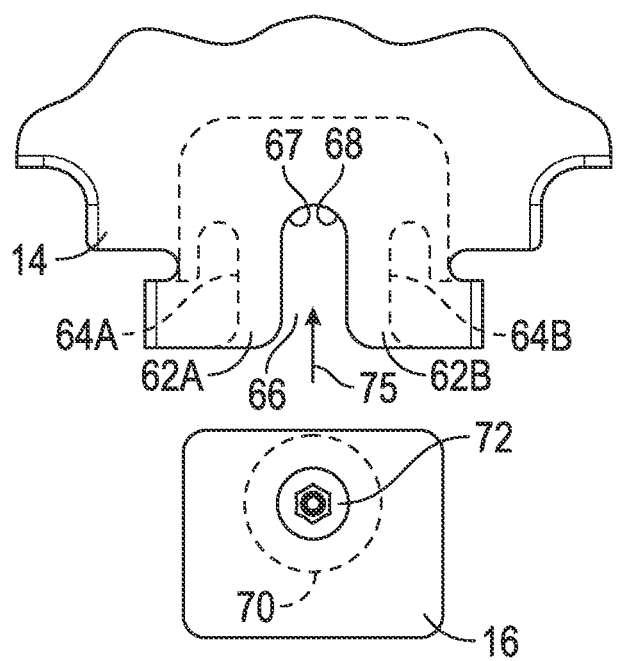
FIG. 6 is a schematic illustration in exploded top view of the mounting bracket in fragmentary view and the plate with the weld stud prior to insertion into a slot in the mounting bracket.

As best shown in FIG. 6, the mounting bracket 14 has sleeve portions 62A, 62B partially defining the slot 58. The mounting bracket 14 can be a stamped steel component. A progressive die may be used to form the mounting bracket 14. The mounting bracket 14 has tangs 64A, 64B that are folded by the die to lay generally parallel with the sleeve portions 62A, 62B, with the slot 58 formed between the sleeve portions 62A, 62B and the tangs 64A, 64B, as shown in FIG. 5. Once formed, the slot 58 has a depth D, shown in FIG. 5, sufficient to permit the plate 16 to be held in the slot 58. The mounting bracket 14 has an open area 66 between the sleeve portions 62A, 62B and has an edge 67 that forms a notch 68 at the end of the open area 66 as indicated in FIG. 6.

Figure 8:
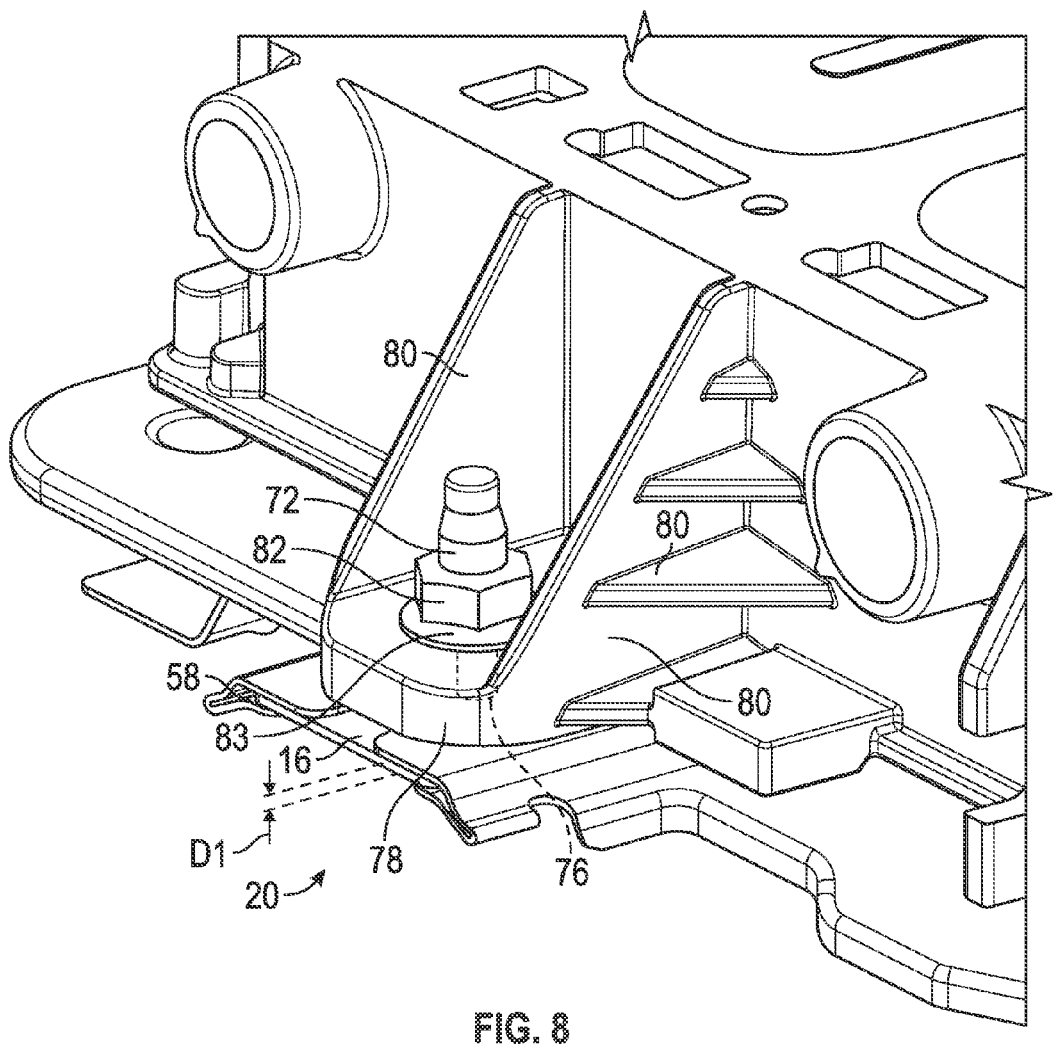
FIG. 8 is a schematic illustration in fragmentary perspective view of the assembly and housing of FIG. 7 after the torque prevailing nut is tightened and prior to an applied force of the barrier of FIG. 2 on the bumper assembly.

FIG. 5 shows that the weld stud 18 has a head 70 welded to one side of the plate 16, and a threaded shaft 72 extending through an opening 74 in the plate 16 to the other side of the plate 16. When the plate 16 is inserted into the slot 58 by moving the plate 16 in the direction of arrow 75 in FIG. 6, the notch 68 is sized to receive the weld stud 18 so that the outer surface of the shaft 72 rests against the edge 67 in the notch 68. The notch 68 thus serves as a locator for the plate 16 by establishing the fully inserted position of the plate 16 when the shaft 72 contacts the edge 67 of the mounting bracket 14 at the notch 68. The shaft 72 extends above the sleeve portions 62A, 62B and is configured to extend through an opening 76 in the power electronics housing 12 when the power electronics housing 12 is mounted to the mounting bracket 14 as shown in FIG. 8. The opening 76 is in a flange 78 of the housing 12. The housing 12 has reinforcing ribs 80 adjacent the flange 78. The ribs 80 strengthen the flange 78 while minimizing added mass. Although not visible in the perspective view of FIG. 8, the ribs 80 on either side of the flange 78 are symmetrical.

Figure 7:
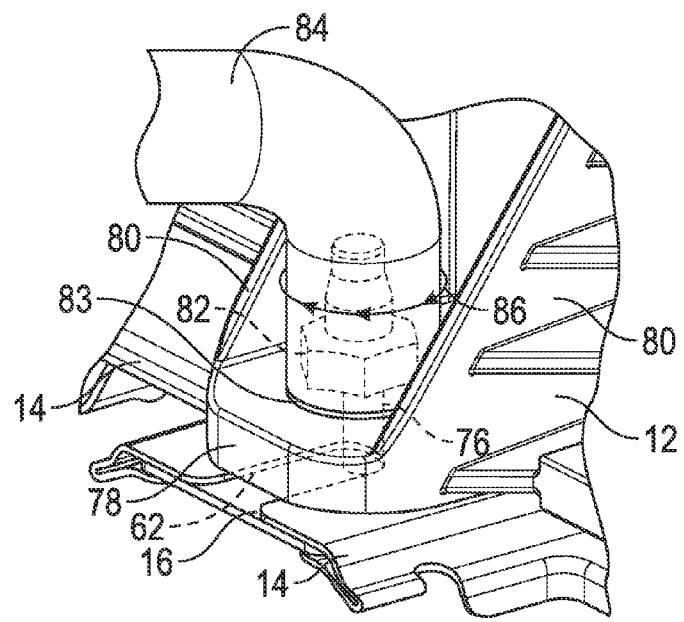
FIG. 7 is a schematic illustration in fragmentary perspective view of the assembly and housing of FIG. 1 with a torque wrench tightening a torque prevailing nut to the weld stud.

A torque prevailing nut 82 is secured to the shaft 72 of the weld stud 18 and is tightened to a predetermined torque by a torque wrench 84 shown in fragmentary view turning the nut 82 in the direction of arrows 86 in FIG. 7. This causes the sleeve portions 62A, 62B of the mounting bracket 14 and the plate 16 to be clamped together between the weld stud head 70 (not visible in FIG. 7) and the flange 78 of the power electronics housing 12. The sleeve portions 62A, 62B of the mounting bracket 14 are thereby captured between the plate 16 and the housing 12 at the stud 18. The tightening of the nut 82 causes the final depth D1 of the slot 58 to be achieved, as shown in FIG. 8, which may be slightly reduced in comparison to the depth D prior to tightening. This creates a predetermined friction fit of the plate 16 to the mounting bracket 14 in the slot 58. A washer 83 is positioned between the nut 82 and the housing 12.

Figure 9:
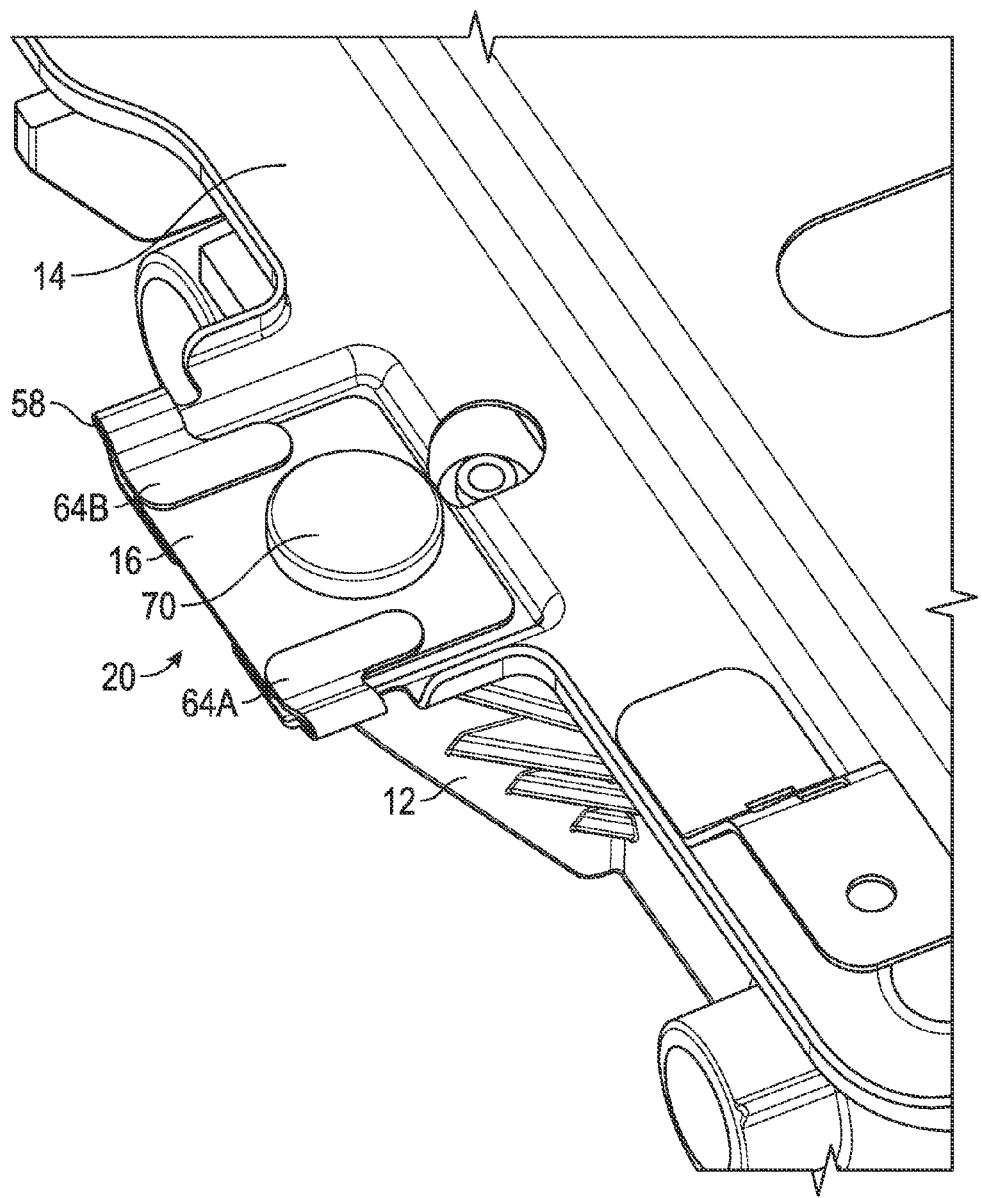
FIG. 9 is a schematic illustration in fragmentary perspective view of the assembly and housing of FIG. 8 from a different perspective showing an underside of the assembly.
Figure 10:
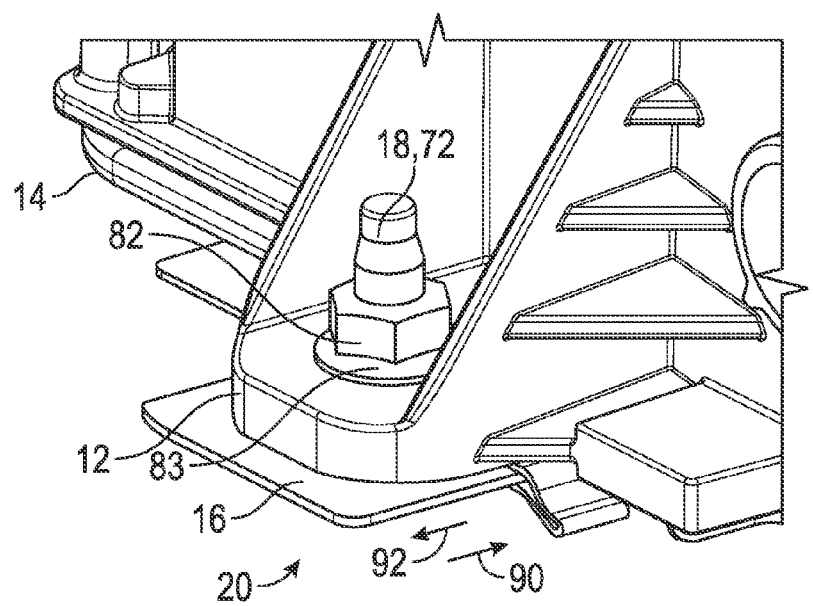
FIG. 10 is a schematic illustration in fragmentary perspective view of the assembly and housing of FIG. 7 as the plate slides in the slot after an applied force by the barrier on the bumper assembly of FIG. 1.
Figure 11:
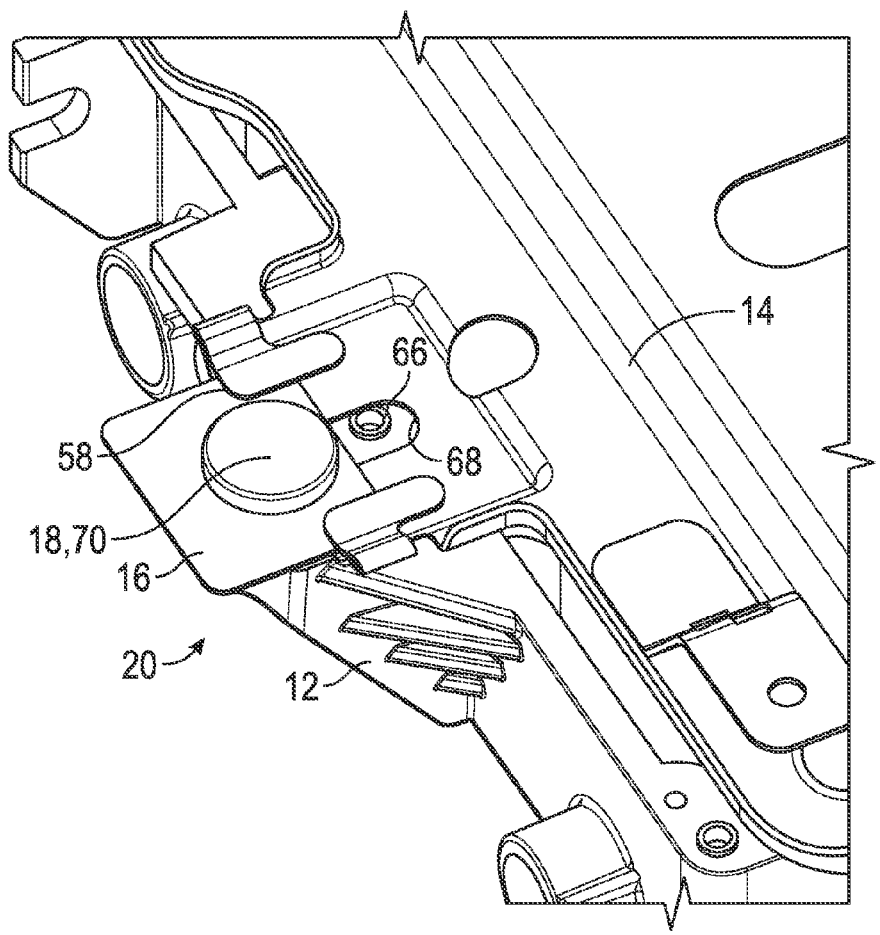
FIG. 11 is a schematic illustration in fragmentary perspective view of the assembly and housing of FIG. 10 from a different perspective showing an underside of the assembly.

FIGS. 8 and 9 illustrate the fully inserted position of the plate 16 and the position of the housing 12 relative to the mounting bracket 14 under normal vehicle operating conditions (i.e., in the absence of an applied force equal to or greater than the force of F1 of predetermined magnitude). FIGS. 10-13 illustrate the progressive sliding of the plate 16 out of the slot 58 in reaction to the predetermined force F1 of at least the predetermined magnitude applied by the barrier B to the bumper assembly 30. In reaction, a force may act to pull the mounting bracket 14 in a forward direction illustrated by arrow 90 in FIG. 10 and/or the power electronics housing 12, plate 16, and weld stud 18 may move as a unit relative to the mounting bracket 14 in a rearward direction illustrated by arrow 92. In either case, there is relative movement between the mounting bracket 14 and the power electronics housing 12 due to the slip joint 20. FIGS. 10-11 show a middle stage of the relative movement, with the weld stud 18 moved away from the notch 68. The shaft 72 of the weld stud 18 moves through the open area 66, free from contact with the mounting bracket 14.

Figure 12:
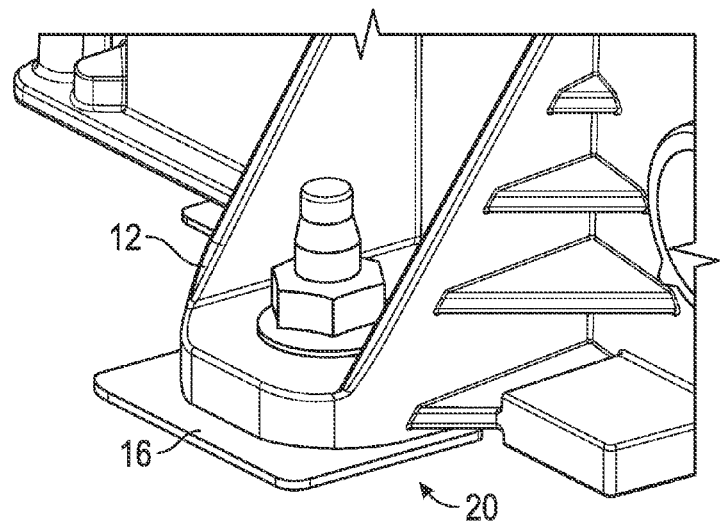
FIG. 12 is a schematic illustration in fragmentary perspective view of the assembly and housing of FIG. 7 as the plate slides entirely out of the slot after an applied force by the barrier on the bumper of FIG. 1.
Figure 13:
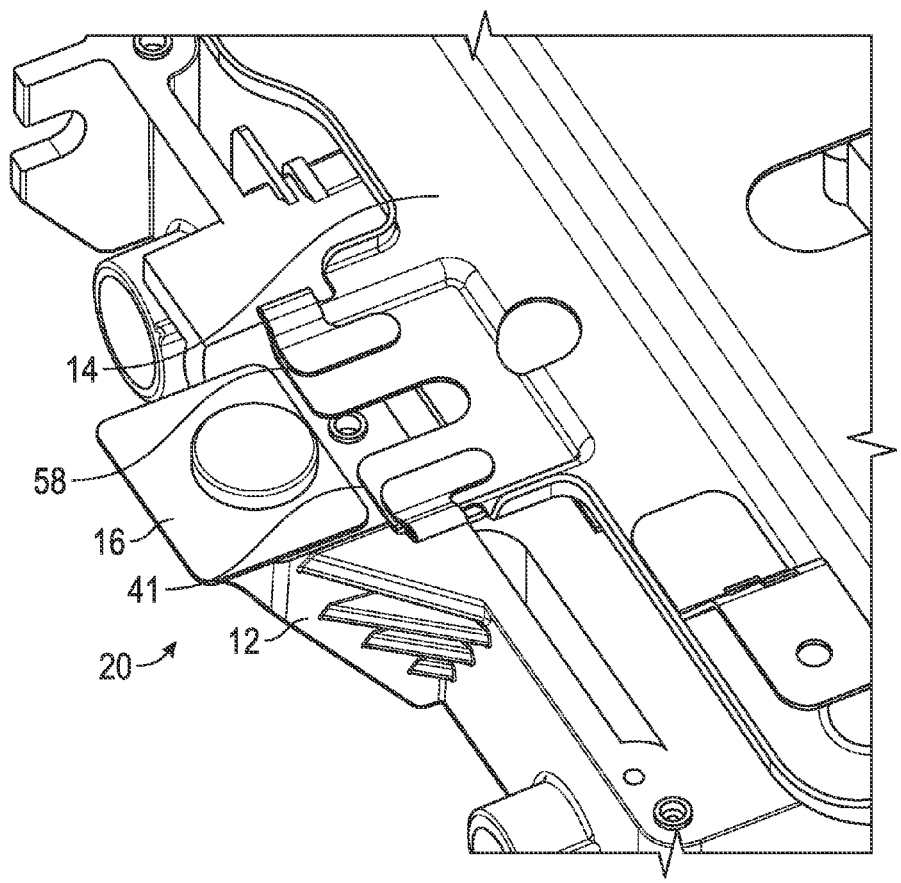
FIG. 13 is a schematic illustration in fragmentary perspective view of the assembly and housing of FIG. 10 from a different perspective showing an underside of the assembly.

FIGS. 12 and 13 show the plate 16 slid completely out of the slot 58 of the mounting bracket 14, freeing the power electronics housing 12 from the mounting bracket 14 at the rearward end 41. The mounting bracket 14 is still secured to the power electronics housing 12 by the fasteners 56 at the forward end 52, shown in FIG. 3, and may deform to manage and dissipate energy of the applied force F1. Freeing of the mounting bracket 14 from the power electronics housing 12 at the rearward end 41 when the plate 16 slides out of the slot 58 may separate loading of the mounting bracket 14 from the power electronics housing 12, thereby reducing or preventing loading of the power electronics housing 12.

Figure 14:
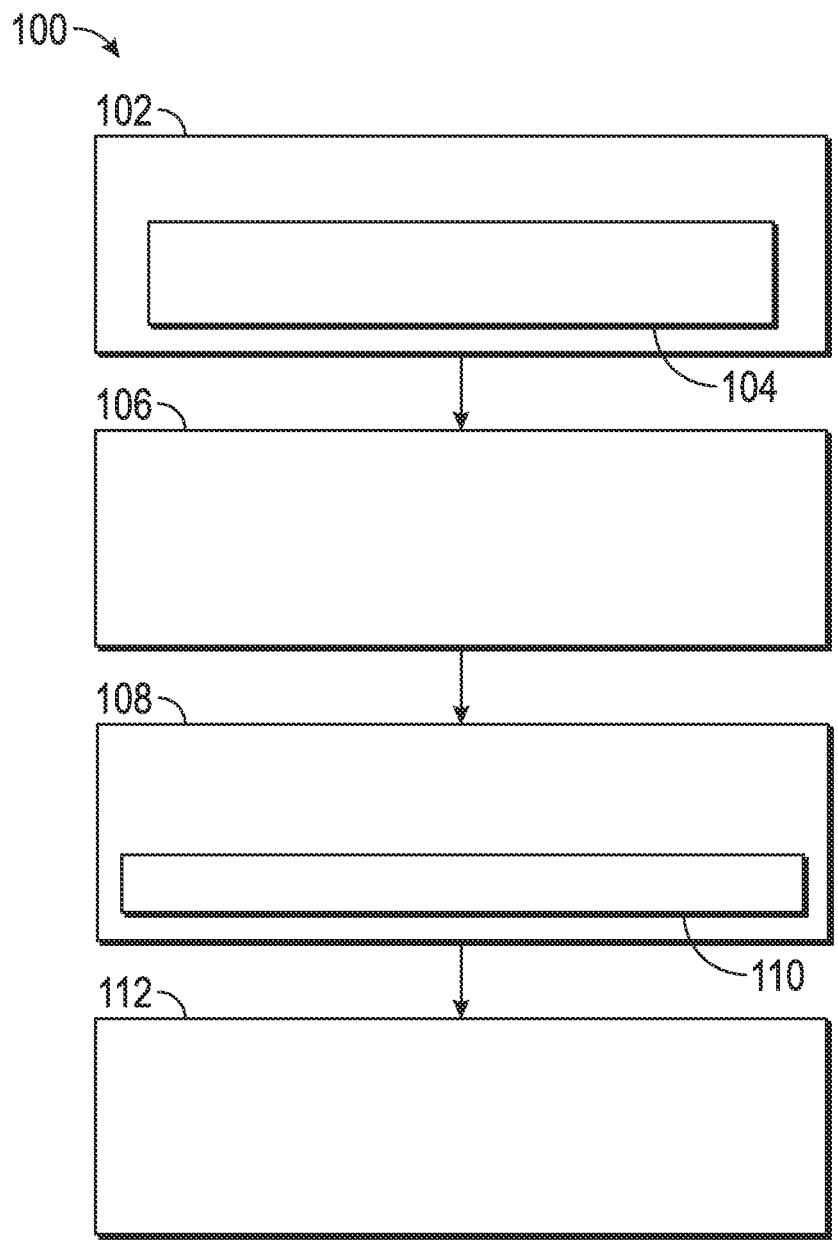
FIG. 14 is a flow diagram of a method of assembling the assembly and power electronics housing of FIG. 1.

Accordingly, a method of assembly 100 described in FIG. 14 enables the desired release of the power electronics housing 12 from the mounting bracket 14 at the slip joint 20 under certain operating conditions, such as under the applied force F1. Specifically, FIG. 14 shows that the method 100 includes step 102, in which the plate 16 is inserted into the slot 58 of the mounting bracket 14. Step 102 may include sub-step 104, in which the shaft 72 of the weld stud 18 is contacted to the mounting bracket 14 in the notch 68. The weld stud 18 is welded to the plate 16 prior to step 102 either as part of the assembly method 100, or the plate 16 can be obtained with the weld stud 18 already welded thereto. The plate 16 and stud 18 may alternatively be formed as a unitary component.

Once the plate 16 is inserted into the slot 58, the shaft 72 of the weld stud 18 will extend above the mounting bracket 14. Accordingly, in step 106, the power electronics housing 12 is mounted to the mounting bracket 14 so that the shaft 72 of the weld stud 18 extends through the opening 76 in the power electronics housing 12. The mounting bracket 14 can then be clamped between the plate 16 and the power electronics housing 12 in step 108. Optionally, the clamping can be carried out under sub-step 110 by the use of a torque prevailing nut 82 that can be tightened to a predetermined torque using a torque wrench 84. By controlling the torque, the clamping force acting generally normal to the plate 16 can be set so that the resulting force required to overcome friction between the plate 16 and the mounting bracket 14 to allow the plate 16 to slide out of the slot 58 is controlled (i.e., is known or predetermined). In step 112, the power electronics housing 12 is secured to the mounting bracket 14 at the additional locations of the fasteners 56 at the opposite forward end 52 of the mounting bracket 14. Step 112 can optionally be carried out prior to or after step 108. The additional fasteners 50, such as for a coolant hose, are also secured to the mounting bracket 14 prior to or after step 108.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An assembly for supporting a vehicle component that has an opening, the assembly comprising:
   a mounting bracket having sleeve portions at least partially defining a slot, the mounting bracket having an edge with a notch between the sleeve portions;
   a plate fit within the slot of the mounting bracket; and
   a stud extending from the plate and received by the notch between the sleeve portions, the stud being configured to extend through the opening in the vehicle component when the vehicle component is mounted to the mounting bracket to capture the mounting bracket between the plate and the vehicle component at the stud,
   wherein the mounting bracket and the plate form a slip joint so that the vehicle component, the stud, and the plate move together relative to the mounting bracket as the plate slides out of the slot to release the mounting bracket from the vehicle component at the stud in response to an applied force of at least a predetermined magnitude.

2. The assembly of claim 1, wherein the mounting bracket has tangs that cooperate with the sleeve portions to define the slot.

3. The assembly of claim 2, wherein the mounting bracket has an open area between the sleeve portions so that the stud moves with the plate through the open area free from contact with the mounting bracket when the plate slides out of the slot.

4. The assembly of claim 1, further comprising:
   a torque prevailing nut secured to the stud and clamping the plate and the mounting bracket together between the stud and the vehicle component when the vehicle component is mounted to the mounting bracket and the torque prevailing nut is tightened to a predetermined torque.

5. The assembly of claim 1, wherein the mounting bracket has a first end and a second end opposite the first end, wherein the slot is at the second end, and wherein the mounting bracket is configured to be further secured to the vehicle component adjacent the first end when the vehicle component is mounted to the mounting bracket.

6. A vehicle comprising:
   vehicle body structure at least partially defining an engine compartment;
   a mounting bracket having a slot and positioned in the engine compartment with the slot at a rearward end of the mounting bracket;
   a vehicle component supported by the mounting bracket in the engine compartment, the vehicle component having an opening;
   a plate fit within the slot; and
   a stud extending from the plate and through the opening in the vehicle component to thereby capture the mounting bracket between the plate and the vehicle component at the stud;
   wherein the mounting bracket and the plate are cooperatively configured so that the vehicle component, the stud, and the plate move together relative to the mounting bracket as the plate slides out of the slot to release the mounting bracket from the vehicle component at the stud when the mounting bracket reacts to a predetermined applied force acting on the body structure.

7. The vehicle of claim 6, wherein the mounting bracket has sleeve portions defining the slot; wherein the mounting bracket has an edge with a notch between the sleeve portions; and wherein the notch is sized to receive the stud.

8. The vehicle of claim 7, wherein the mounting bracket has an open area between the sleeve portions so that the stud moves with the plate through the open area free from contact with the mounting bracket when the plate slides out of the slot.

9. The vehicle of claim 6, further comprising:
a torque prevailing nut secured to the stud and configured to clamp the plate and the mounting bracket together between the stud and the vehicle component when the torque prevailing nut is tightened to a predetermined torque.

10. The vehicle of claim 6, wherein the mounting bracket has a forward end opposite the rearward end; and wherein the mounting bracket is further secured to the vehicle component adjacent the forward end.

11. The vehicle of claim 6, wherein the vehicle component is a power electronics housing.

12. The vehicle of claim 6, wherein the vehicle component has a flange; wherein the opening is in the flange; and wherein the vehicle component has reinforcing ribs adjacent the flange.

13. The vehicle of claim 6, wherein the vehicle has a longitudinal center axis; wherein the body structure includes a bumper assembly establishing a forward end of the vehicle; and wherein the mounting bracket and the vehicle component are positioned rearward of the bumper assembly and laterally offset from the longitudinal center axis.

14. The assembly of claim 1, further comprising one or more brackets attached to the mounting bracket and configured to directly connect to body structure of a motor vehicle.

15. The assembly of claim 1, wherein the vehicle component includes a housing defining the opening, and wherein the mounting bracket includes fastener slots configured to receive therethrough fasteners that engage the housing and thereby secure the vehicle component to the mounting bracket.

16. An assembly for supporting a vehicle component having an opening, the assembly comprising:
a mounting bracket having a slot;
a plate fit within the slot;
a stud extending from the plate and configured to extend through the opening in the vehicle component when the vehicle component is mounted to the mounting bracket to capture the mounting bracket between the plate and the vehicle component at the stud; and
a torque prevailing nut secured to the stud and configured to clamp the plate to the mounting bracket between the stud and the vehicle component when the vehicle component is mounted to the mounting bracket and the torque prevailing nut is tightened to a predetermined torque,
wherein the mounting bracket and the plate form a slip joint such that the vehicle component, the stud, and the plate move together relative to the mounting bracket as the plate slides out of the slot to release the mounting bracket from the vehicle component at the stud in response to an applied force of at least a predetermined magnitude.

17. The assembly of claim 16, wherein the mounting bracket has sleeve portions at least partially defining the slot, the slot having an edge with a notch between the sleeve portions, and the notch being sized to receive therein the stud.

18. The assembly of claim 17, wherein the mounting bracket has tangs that are parallel to and cooperate with the sleeve portions to define the slot.

19. The assembly of claim 17, further comprising one or more brackets attached to the mounting bracket and configured to directly connect to body structure of a motor vehicle.

20. The assembly of claim 17, wherein the vehicle component includes a power electronics housing defining the opening, and wherein the mounting bracket includes fastener slots configured to receive therethrough fasteners that engage the power electronics housing and thereby secure the vehicle component to the mounting bracket.

\* \* \* \* \*